US006457450B1

(12) United States Patent
Luzhkov

(10) Patent No.: US 6,457,450 B1
(45) Date of Patent: Oct. 1, 2002

(54) JU. M. LUZHKOV ROTARY-TURBINE INTERNAL COMBUSTION ENGINE

(75) Inventor: Jury Mikhaylovich Luzhkov, Russia, 125047 Moscow, 3-ya Tverskaya-Yamskaya ulitsa,48,kv.15 (RU)

(73) Assignees: Jury Mikhaylovich Luzhkov, Moscow (RU); Otkrytoe Aktsionernoe Obschestvo "A. Lyulka-Saturn", Moscow (RU)

( * ) Notice: Subject to any disclaimer, the term of this patent is extended or adjusted under 35 U.S.C. 154(b) by 0 days.

(21) Appl. No.: 09/831,919

(22) PCT Filed: Mar. 1, 2000

(86) PCT No.: PCT/RU00/00068
§ 371 (c)(1), (2), (4) Date: May 29, 2001
§ 102(e) Date: May 29, 2001

(87) PCT Pub. No.: WO01/65086
PCT Pub. Date: Sep. 7, 2001

(51) Int. Cl.[7] ............................................... F02B 53/00
(52) U.S. Cl. ..................... 123/241; 123/43 R; 418/261; 418/264; 418/176; 418/136
(58) Field of Search ................................. 123/241, 227, 123/43 R; 418/136, 261, 264, 176

(56) References Cited

U.S. PATENT DOCUMENTS

| 1,400,255 | A | * | 12/1921 | Anderson | 123/241 |
| 1,458,361 | A | * | 6/1923 | Ruttledge | 418/136 |
| 2,121,660 | A | * | 6/1938 | Hammers | 123/241 |
| 3,871,337 | A | * | 3/1975 | Green et al. | 123/43 R |
| 3,971,347 | A | | 7/1976 | Vasilantone | 418/147 |
| 4,072,132 | A | * | 2/1978 | Lindros | 123/43 R |
| 5,261,365 | A | | 11/1993 | Edwards | 123/241 |
| 5,345,905 | A | | 9/1994 | Edwards | 123/241 |

FOREIGN PATENT DOCUMENTS

| DE | 29 19 417 | | 11/1980 | |
| DE | 42 25 932 A1 | * | 2/1994 | 123/241 |
| EP | 103985 A2 | * | 3/1984 | 418/264 |
| FR | 2 121 906 | | 8/1972 | |
| FR | 2 651 828 A1 | * | 11/1989 | 123/43 R |
| JP | 357210193 A | * | 12/1982 | 418/264 |
| JP | 358106193 A | * | 6/1983 | 418/176 |
| JP | 359028086 | * | 2/1984 | 418/261 |
| RU | 1518555 | | 10/1989 | |

* cited by examiner

*Primary Examiner*—Thomas Denion
*Assistant Examiner*—Thai-Ba Trieu
(74) *Attorney, Agent, or Firm*—Oblon, Spivak, McClelland, Maier & Neustadt, P.C.

(57) ABSTRACT

A rotary-turbine internal combustion engine, having working members that make oscillatory movements about an axle fixed to a rotor using carriers that couple the working members and a guide on a body, makes it possible to provide good smoothness of rolling over the guide by carriers and a simpler shape of the guide. Simplicity of the shape makes it possible to obtain high quality of working surfaces, good smoothness of rolling over the guide profile and high frequencies of rotation of the rotor. A rotary-turbine internal combustion engine includes a rotor having longitudinal flaps swivel-mounted along the axis of rotation of the rotor in the area of the external diameter of the rotor, which flaps separate from one another the spaces disposed on both sides of each of the flaps. The rotor is positioned in a cylindrical body, on whose end face wall is arranged an annular guide that contacts carriers of the flaps. The longitudinal axis of the annular guide is set with an eccentricity with respect to the axis of rotation of the rotor.

21 Claims, 6 Drawing Sheets

JU. M. LUZHKOV ROTARY-TURBINE INTERNAL COMBUSTION ENGINE

TECHNICAL FIELD

The invention relates to internal combustion engines, in particular to rotary engines whose working members make oscillatory motions about an axle fixed on a rotor.

Known is a rotary internal combustion engine, comprising a rotor having radial-longitudinal posts and longitudinal blades swivel-mounted in the area of their external diameter, which blades have carriers that contact a guiding means, the rotor being positioned in a cylindrical body limited at its end faces by lateral walls and having an inlet opening and an outlet opening, a working chamber being defined by the external surface of a longitudinal blade, the cylindrical surface of the body and by the lateral walls of the body. A coaxial driven shaft is provided having additional radial posts and bell cranks articulated to the rotor working blades. (USSR Inventor's Certificate N 1518555 IPC F 02 B 53/00, published 1989).

BACKGROUND ART

The air in the engine is compressed by rotation of adjacent blades of the rotor and rotation of the driven shaft about the posts when a cam is subjected to being rolled upon by a follower roller of the adjacent blades' articulation.

A drawback of the known invention is the presence of an auxiliary driven shaft, which, furthermore, rotates at a variable velocity with respect to the driver shaft rotation angle, which makes the construction of this device complex. It should be noted that in this solution, as in many internal combustion engines, only the exterior side of the blades (one side of a cylinder in piston internal combustion engines) participates in the work cycle. From the point of view of the work cycle, the space under the blades is not utilized.

This drawback is eliminated in another technical solution, namely, in a rotary internal combustion engine that comprises a rotor having longitudinal flaps that are swivel mounted thereon in the area of the external diameter along its rotation axis and separate one from another the spaces arranged therein on both sides of each of the flaps, and which rotor is installed in a cylindrical body on whose end face wall is disposed a closed oval-shaped guide in contact with the carriers of the flaps, and a conduit for gas-exchange between the spaces located on both sides of the flaps. The end face surfaces of the flaps and the surfaces of adjacent posts that contact the end face surfaces of the flaps are conjugated, contact one another, each of the flaps separating the compression space from the working space. Suction and exhaust openings are provided. (U.S. Pat. No. 5,261,365, NPC 123-241 published 1993; U.S. Pat. No. 5,345,905, NPC 123-241 published 1994).

A feature of this solution that is advantageous is that both sides of a flap participate in the work cycle of the engine, one side participating as a compression space wall, the other participating as a working space wall.

This technical solution has a number of substantial drawbacks. The carriers are made in the form of cylindrical pins on the end face surfaces of the flaps. This results in that in such an arrangement there will always be gas leakage occurring through slits in the rotor wall and in the body wall. An attempt to reduce these leakages in U.S. Pat. No. 5,261,365, NPC 123-241, published 1993, and U.S. Pat. No. 5,345,905, NPC 123-241, published 1994 by thickening the flap wall results in a decrease of the volumes of the working spaces and the compression spaces.

As a result of the fact that the carrier pins are fixed to flaps (made as an integral part of the flaps) and transmission of the working forces to the engine is effected through these pins, then their design has to be stronger and they necessarily have to be positioned on both sides of the flaps. Otherwise, if the pins are positioned on only one side, they have to be made much bigger, which will result in increased leakage. Furthermore, in the case where the pins are disposed on one side of a flap end face, the flap may be affected by skewness, seizure, and even a failure of the engine may occur. Strengthening the pins and increasing the rigidity of the flaps by increasing their size is also unacceptable here, since this will result in a reduction of the working volumes of the engine.

Another drawback is that in such an engine the carrier is situated in a high-temperature zone, it cannot be cooled well, and acceptable working conditions for the carrier-guide groove friction pair cannot be provided.

A very substantial drawback of the solutions disclosed in U.S. Pat. No. 5,261,365, NPC 123-241, published 1993 and U.S. Pat. No. 5,345,905, NPC 123-241 published 1994, is that the guide for the carriers, which is made in the form of grooves on the end face walls of the body, has a complex shape. This results in that with such a groove:

a) it is virtually impossible to achieve a sufficiently high frequency of engine rotor rotation;

b) it is technologically difficult to attain high-precision manufacture and high quality of the groove surface. The material of which this part should be made, should, on the one hand, be easily machined and be sufficiently ductile in view of being subjected to impact loads, and, on the other hand, should have very high hardness so that it would be capable of working for a lengthy period under conditions of continuous friction of the groove-carrier pair.

DISCLOSURE OF THE INVENTION

The object of the invention is to create a guide of such a shape, that it, while providing good smoothness of travel of a carrier thereon, would be simple to manufacture with high quality of the working surfaces. Achievement of this object makes it possible to obtain high frequencies of engine rotor rotation.

Additional objects of the invention are to create normal working conditions for the carrier-guide pair as regards temperature, lubrication quality, and, furthermore, to obtain a torque on the engine rotor that is also due to the reactive force obtained during waste gas exhaust (by use of a turbo-effect).

This object is attained in that in a rotary-turbine internal combustion engine comprising a rotor having longitudinal flaps that are swivel-mounted on the rotor in the area of the external diameter along its rotation axis and separate one from another the spaces arranged therein on both sides of each flap, the rotor being positioned in a cylindrical body on whose end face wall is arranged a closed guide in contact with carriers of the flaps, and a conduit for gas-exchange between the spaces disposed on both sides of the flaps, a guide therein and disposed on the end face wall of the body being made as an annular guide, and its longitudinal axis is set with an eccentricity relative to the rotation axis of the rotor. This object is also attained in that the annular guide is made in a floating ring that is coaxial with the guide and is positioned on the end face wall of the body.

The invention is novel in that the guide, disposed on the end face wall of the body, is made annular and its longitudinal axis is set with an eccentricity relative to the rotation axis of the rotor, the guide may be made in a floating ring that is coaxial with the guide and is positioned on the end face wall of the body, for example in the form of a groove extending to the end face of the floating ring.

Furthermore, the invention may be provided with the following features:

a) for a rotor having an end face wall—each carrier is made in the form of a crank positioned outside the wall and rigidly connected to a flap, so that the axes of rotation of the crank and the flap swivel coincide, and a second end of the crank contacts the guide;

b) a second end face of the rotor is made to directly contact the second end face wall of the body, which wall is provided with a suction opening that connects to a space under a flap, and further is provided with an inlet and an outlet of the gas-exchange conduit, the inlet of the gas-exchange conduit being disposed opposite the space under the flap in the area of the minimal distance between the flap and the rotation axis of the rotor, and the outlet of the gas-exchange conduit being disposed opposite the space above the flap, the suction opening being disposed in an angular position in the area of maximal displacement of the guide profile with respect to the rotation axis of the rotor; the inlet and outlet of the gas-exchange conduit and also an exhaust opening being disposed in an angular position in the area of the minimal displacement of the guide profile with respect to the rotation axis of the rotor;

c) the engine is made as a unit of two single engines that face one another via the end face walls of the bodies, the walls directly contacting the end faces of the rotors, shafts of the rotors are rigidly interconnected, wherein the walls of the bodies form an integral end face wall of the unit, eccentricities of the longitudinal axes of the guides of the two engines are directed in directions that are opposite to the axis of rotation of the rotors;

d) an additional space that communicates with the existing space is formed on the rotor wall under each of the flaps, a through opening that communicates with the gas-exchange conduit inlet is made in the wall of the additional space;

e) the inlet of the gas-exchange conduit on the end face wall of the body is provided with a segment groove that is directed in the direction opposite to the direction of rotation of the rotor;

f) the rotor along its external diameter is provided with a wall, tangential openings, for example in the form of slot nozzles, being made in the wall;

g) the suction opening is made arched and extends in a direction that is opposite to the direction of rotation of the rotor.

Making the guide annular makes it possible to attain the maximally high frequencies of rotation of the rotor in such an engine, which frequencies are attained owing to smoothness of the rolling motion of the guide profile and owing to the quality of the working surfaces of the guide. High precision in manufacturing, high surface finish, quality of the surface layer in respect to hardness and coatings are easily ensured in this case.

Setting the longitudinal axis of the annular guide with an eccentricity relative to the rotation axis of the rotor provides for cyclic turning the flaps when use is made of a guide which is the simplest as regards the technology utilized.

Each flap, using its carrier that rolls on a guide which is positioned with an eccentricity relative to the rotation axis of the rotor, for one complete revolution of the engine will carry out, via its external side, compression of the air over the flap and expansion of the hot gas, and the internal side of the flap will ensure suction of the air, its slight precompression and transfer of this precompressed air to blow the space above the flap and fill this space with air for further compression therein. In one complete revolution of the rotor, the flap makes it possible to carry out the complete cycle of a two-stroke engine. The number of such complete cycles in one revolution of the rotor will be equal to the number of flaps provided on the rotor.

Making the annular guide in a floating ring that is coaxial with the guide and is disposed on the end face wall of the body makes it possible, as a result of the circular rotation of this ring, for ever new regions of the ring to contact the second end of the carrier, which enhances its service life. Rotation of the floating ring relative to the body reduces the relative velocity of the end of the carrier and of the guide. Moreover, the floating ring is an excellent damper. An annular groove that will comprise the guide is easily made in this ring.

Making each carrier in the form of a crank positioned outside the side wall of the rotor, one end of the crank contacting the guiding groove, both the crank itself and the point of contact with the guide will be located in the zone of relatively low temperatures, which makes it possible to organize reliable oil cooling in this location. In such an arrangement the lateral wall of the rotor now reliably covers the high temperature zone.

Rigidly connecting the crank to a flap in such a manner that their rotation axes will coincide, the torque effected from the flap to the crank will now be transmitted via the swivel shaft, which shaft is easily sealed. Strengthening this assembly will not be difficult, since even substantial strengthening of the swivel will cause a minimal reduction of the working volumes of the engine spaces. The possibility to transmit large torques via a system of cranks, disposed on one side of the rotor, will free the second wall of the body and make it possible to use it for other purposes that are very important for the engine.

Making the second end face of the rotor in direct contact with the end face wall of the body, the second end face wall of the body becomes a portion of the spaces above and under each of the flaps, and therefore it is easy to make the suction opening, having the required working area, and also the inlet and outlet of the gas-exchange conduit on that wall.

Arranging the gas-exchange conduit inlet opposite the space under the flap in the area of the minimal distance between it and the rotation axis of the rotor, and its outlet opposite the space above the flap, and turning the suction opening in an angular position in the area of the maximum shift of the guide profile with respect to the rotation axis of the rotor, and arranging the inlet and outlet of the gas-exchange conduit and also the exhaust opening in the area of the minimum shift of the guide profile with respect to the rotation axis of the rotor, it is possible to carry out the selected cycle of operation of the proposed engine, i.e. the two-stroke cycle.

Making the unit as consisting of two engines facing one another by the end face walls of the bodies, which directly contact the end faces of the rotors, and rigidly connecting the rotor shafts to each other, a single end face wall of the unit is obtained. Having such a single end face wall of the unit, which wall is in direct contact with two rotors composing a single whole, and directing the eccentricities of the longitudinal axes of the guides of these engines in directions that are opposite to the axis of rotation of the rotors, a virtually balanced system of two rotors will be provided. In this system the forced imbalance of one rotor, occurring during operation of the engine, is compensated by the oppositely directed forced disbalance of the other rotor, occurring due to movement of the flaps. Furthermore, the necessity of installing two flywheels-counterbalances, as in the Wankel engine, will be obviated.

Providing an additional space on the rotor wall under each of the flaps, which space communicates with the existing space and has a through opening in the wall thereof, the opening communicating with the gas exchange conduit inlet, a space is formed, by means of which the precompression pressure in the space under the flap may be adjusted. This pressure must be selected during operational development of an engine, taking into account that this pressure should be minimal because energy is consumed, but should be sufficient to provide guaranteed blowing of the waste gases from the space above the flap and filling it with clean air.

Providing the gas-exchange conduit inlet on the end face wall of the body with a segment groove directed opposite to the direction of rotation of the rotor makes it possible to adjust the precompression pressure in the space under the flap. This becomes possible in view of the fact that the air for blowing is initially taken from zones having lower air pressure.

Providing the rotor, on its external diameter, with a wall having tangential openings, it becomes possible to also obtain a torque on the rotor by virtue of the reactive force brought about during blowing of the hot gas through these openings, i.e. there is the possibility to use the turbine effect and have an almost complete expansion of the hot gases up to the atmospheric pressure. The turbine effect is enhanced when the tangential openings are made in the form of slot nozzles.

Making the suction opening arched, extended in the direction opposite to the direction of rotation of the rotor, together with increasing the suction area, the suction can begin virtually immediately after the compressed air has been evacuated from the space under the flap for blowing, and this means that there will be no negative pressure (vacuum) under the flap, and no expenditure of energy for this will be required.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

BEST MODE FOR CARRYING OUT THE INVENTION

Figure 1:
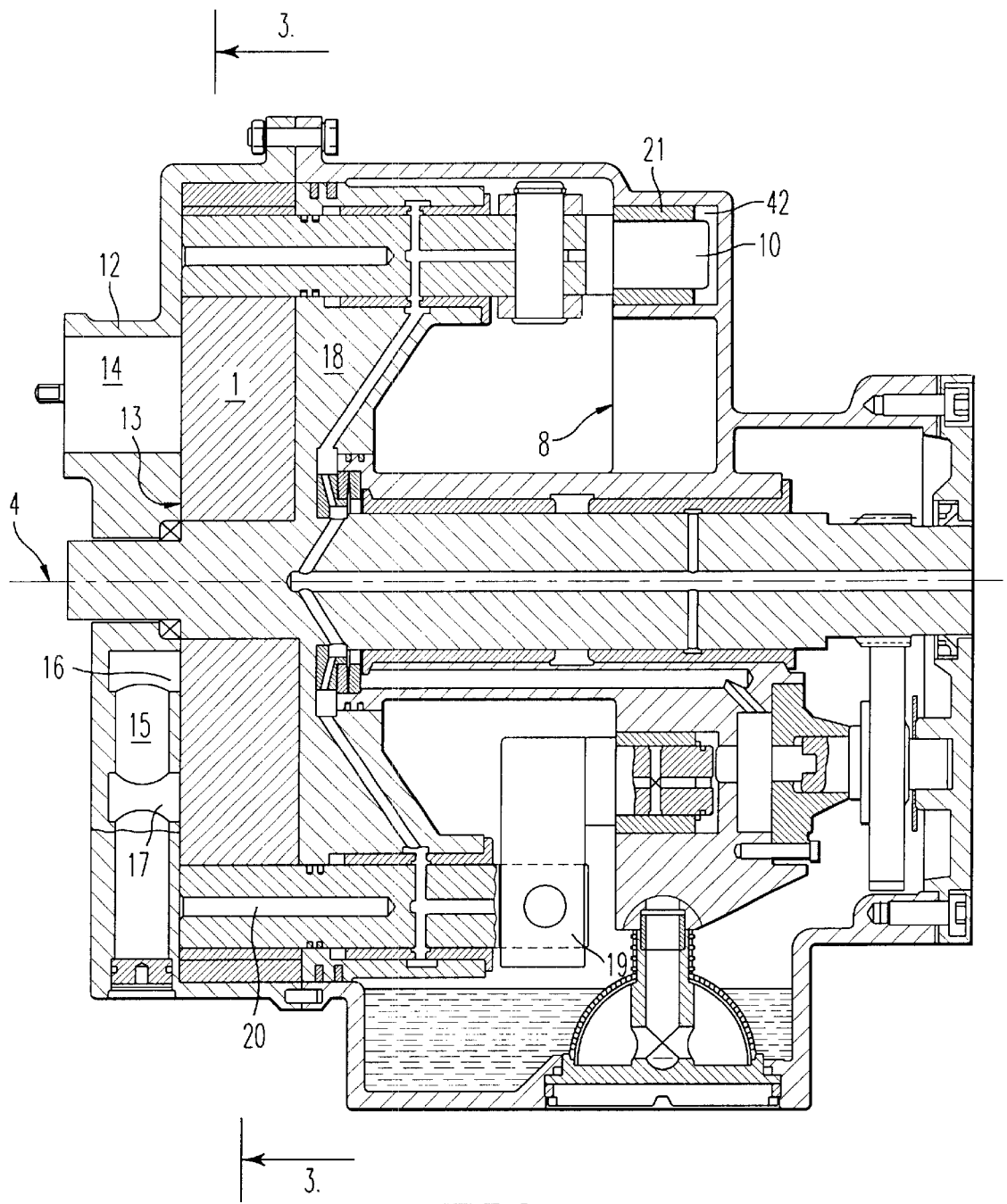
FIG. 1 shows a longitudinal section of the proposed engine taken along the line 1—1 in FIG. 3 wherein a guide is shown as an annular groove on the end face wall of the body.
Figure 2:
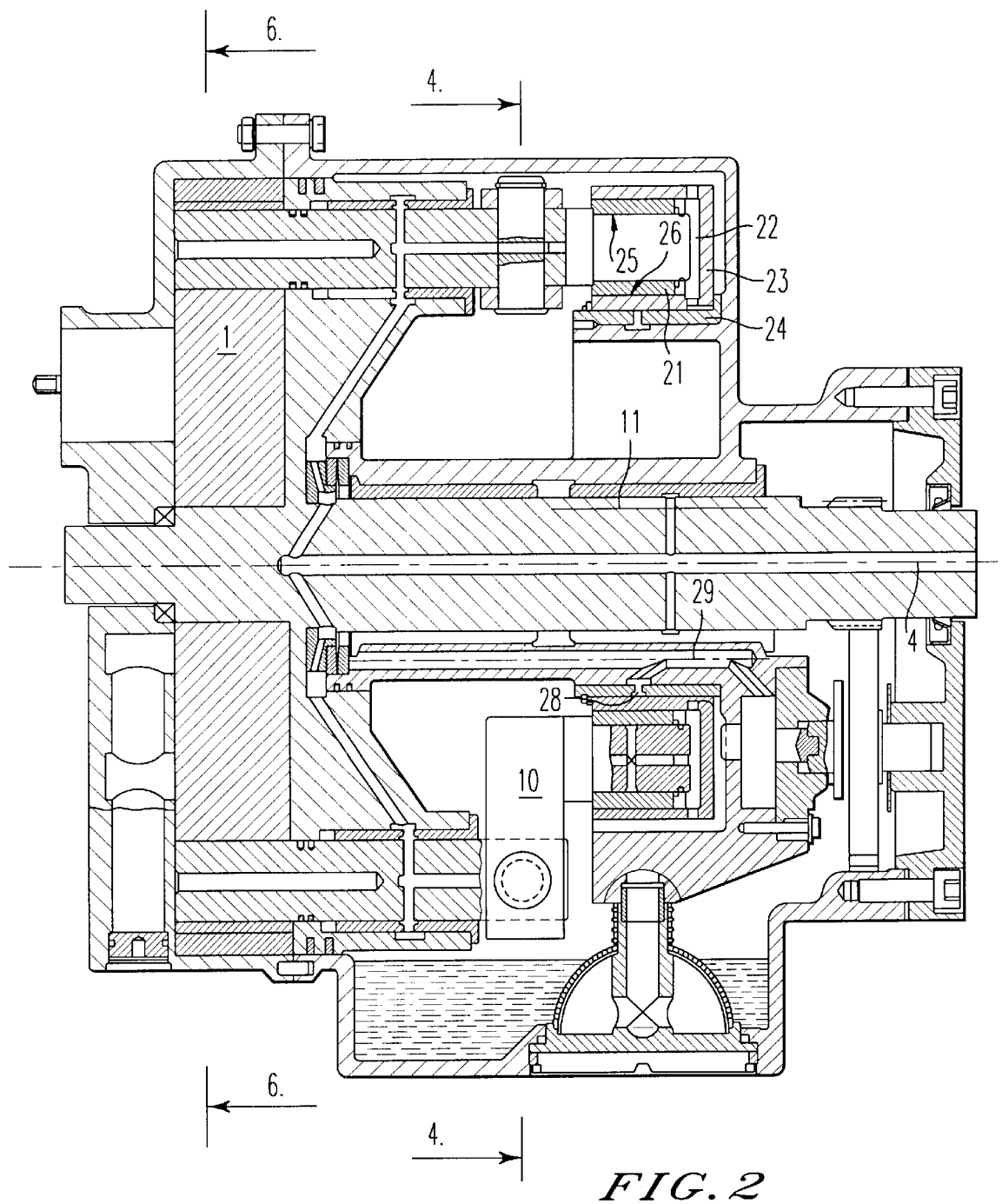
FIG. 2 shows a longitudinal section of the engine line 2—2 in FIG. 3 with an annular guide in the form of a floating ring.
Figure 3:
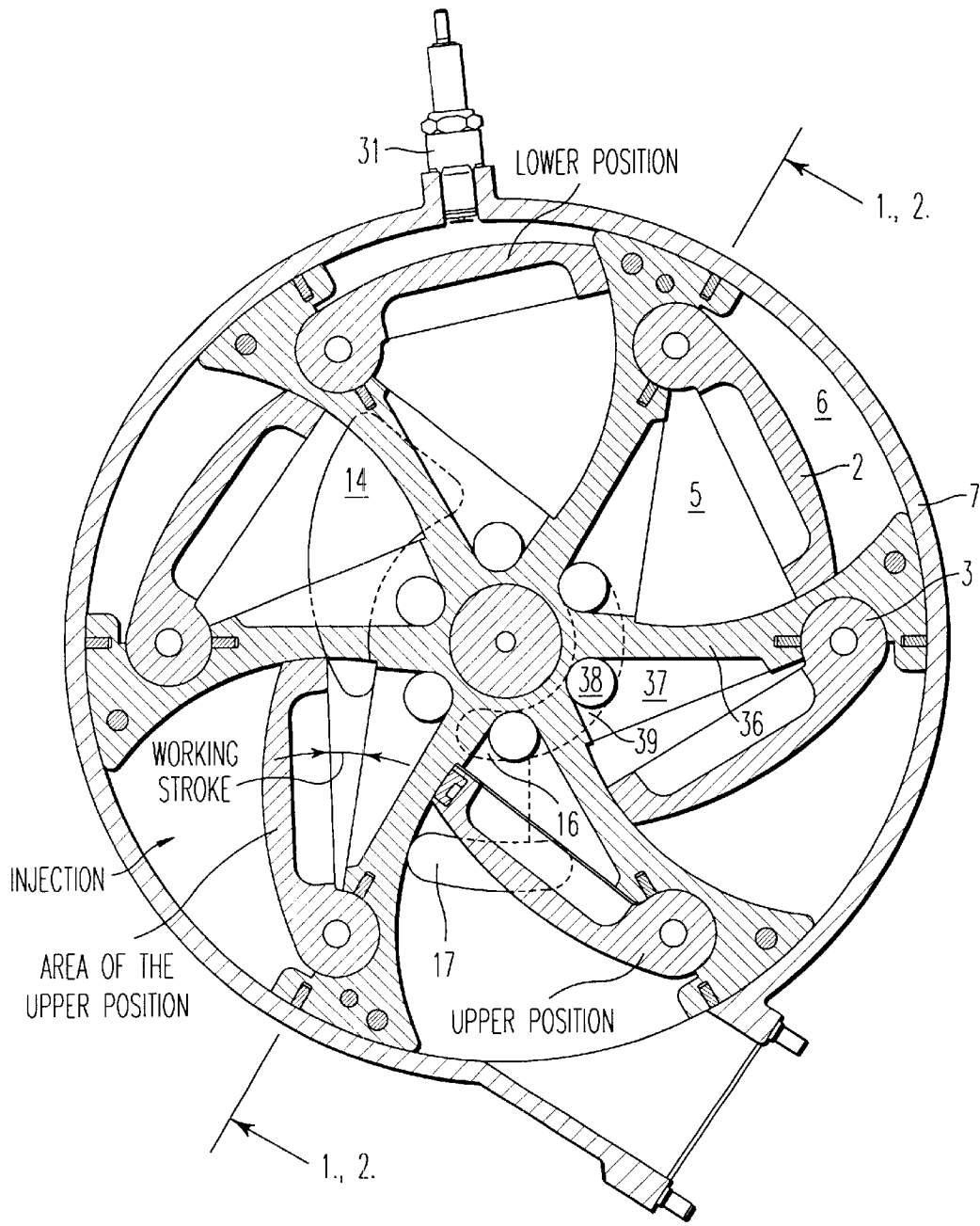
FIG. 3 shows a transverse section of the engine taken along 3—3 in FIG. 2 in the area of the flaps.
Figure 4:
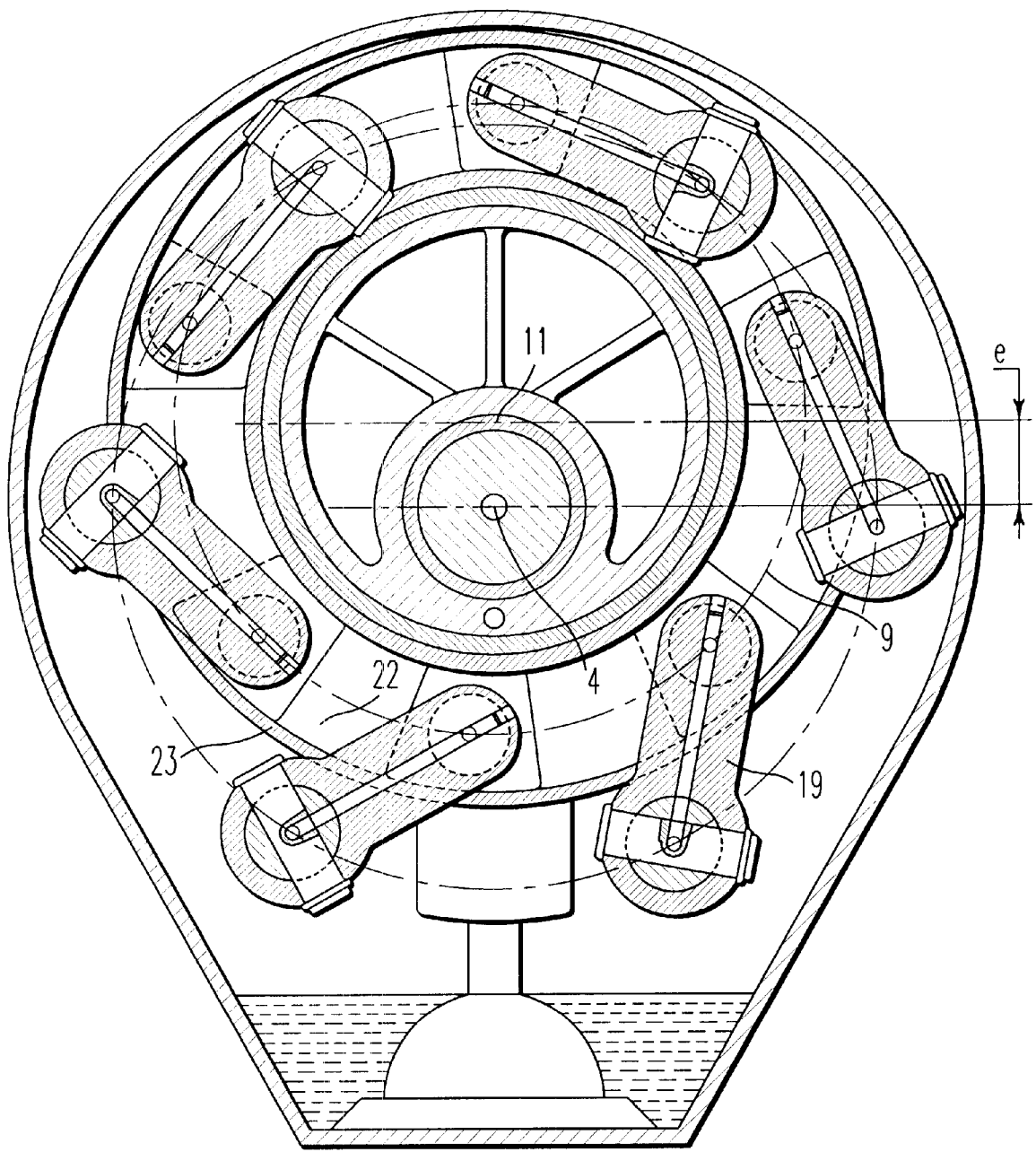
FIG. 4 shows a transverse section of the engine taken along 4—4 in FIG. 2 in the area of a crank.
Figure 5:
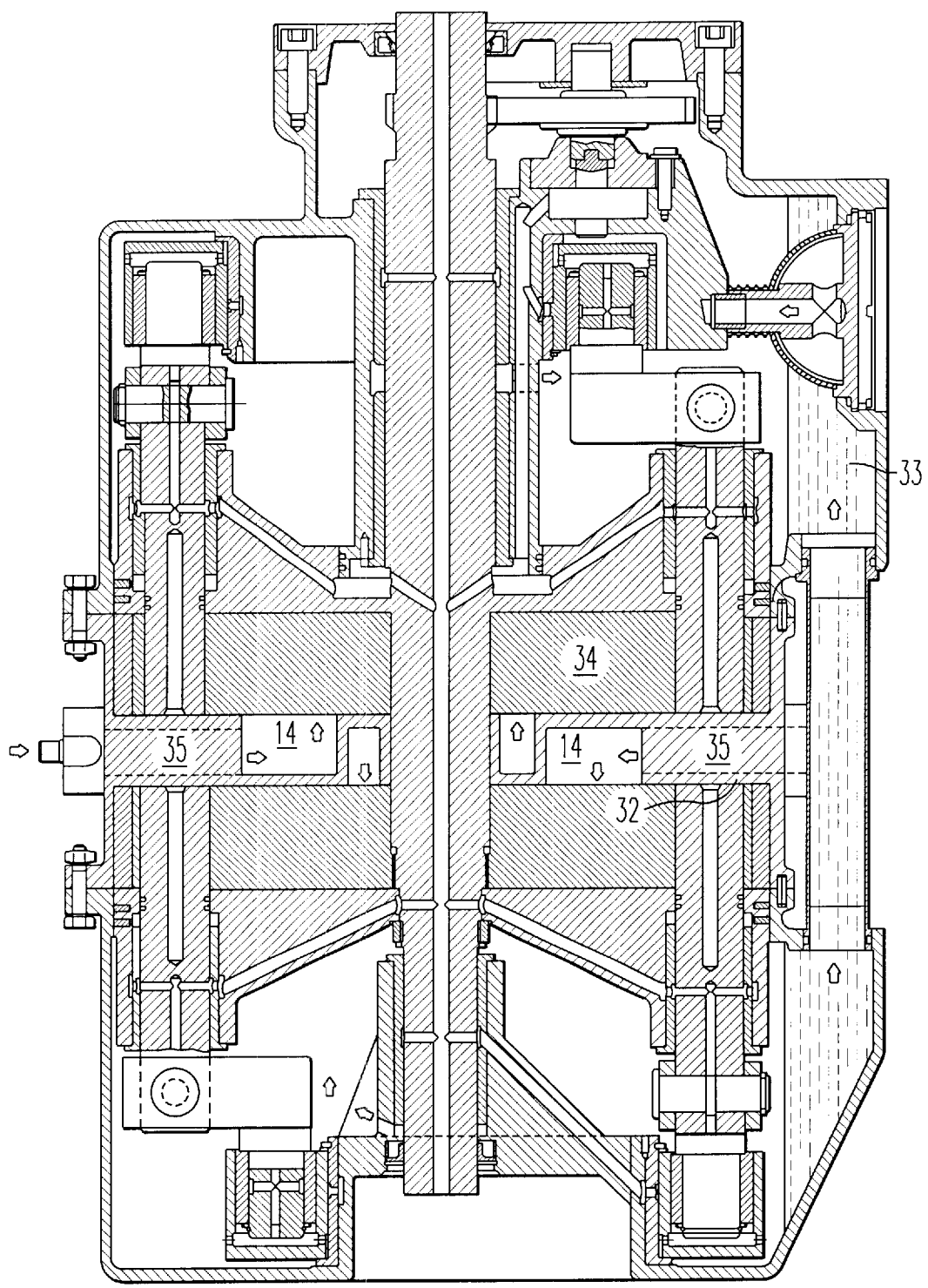
FIG. 5 shows a longitudinal section of an engine unit.
Figures 6, 7:
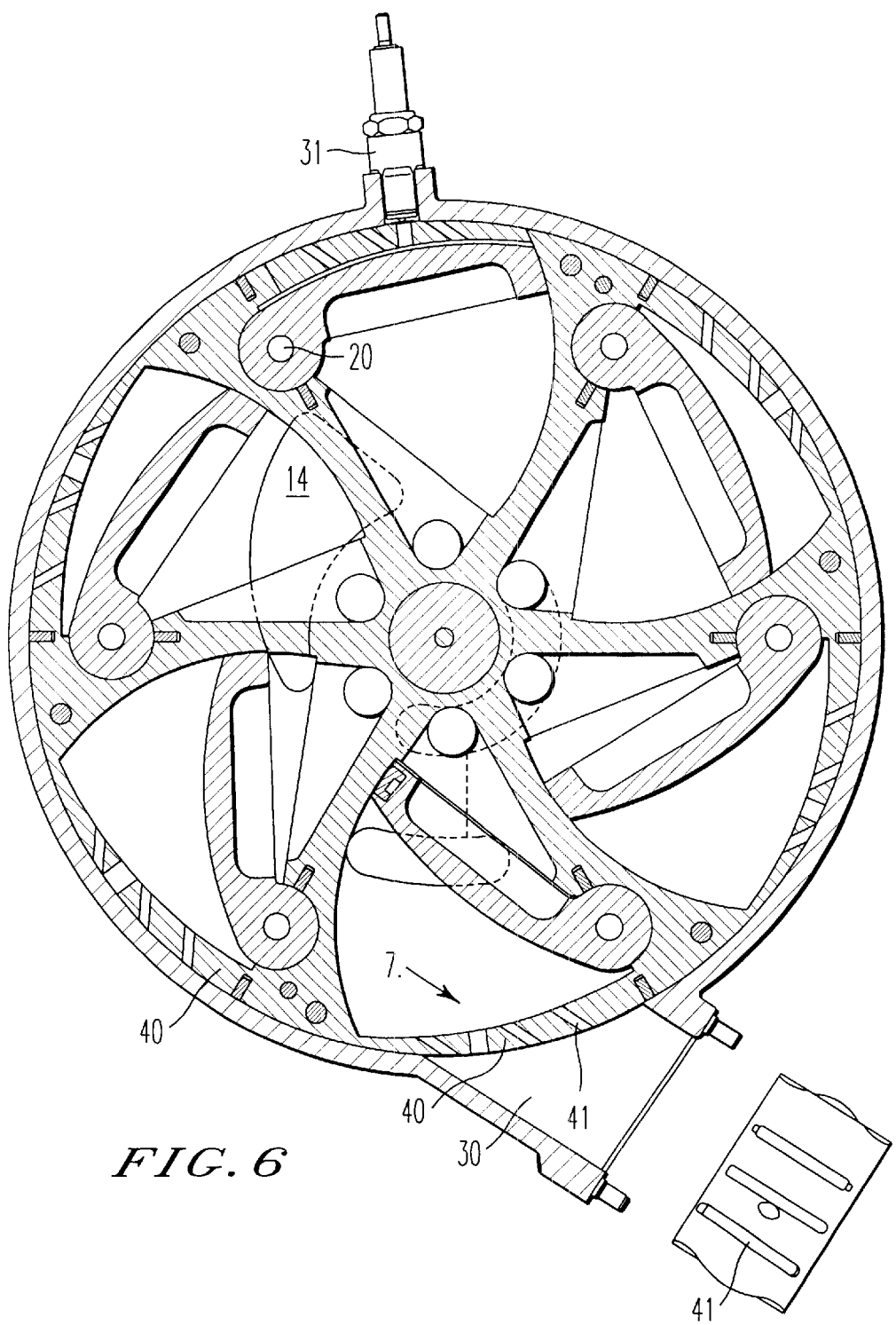
FIG. 6 shows a transverse section of the engine taken along 6—6, wherein a wall having tangential openings in the form of slot nozzles is made along the external diameter of the rotor.
FIG. 7 shows a view taken in the direction of arrow 7 in FIG. 6.

A rotary-turbine internal combustion engine comprises a rotor 1 having longitudinal flaps 2 attached using swivels 3 in the area of the external diameter of the rotor 1 along its axis of rotation 4. Each flap 2 separates a space 5 under a flap and a space 6 above the flap, one from the other. The rotor 1 is mounted in a cylindrical body 7, on whose end face wall 8 is arranged a closed annular guide 9 that contacts carriers 10 of flaps 2. The longitudinal axis 11 of the guide 9 is mounted with an eccentricity "e" relative to the axis of rotation 4 of rotor 1. In this embodiment, the longitudinal axis 11 of the guide 9 is shifted vertically upwards with respect to the axis of rotation 4 of the rotor 1, although as regards the engine, the direction of eccentricity is of no importance. A second end face wall of the body 7 is made in the form of a removable cover 12 that is in direct contact with an end face 13 of the rotor 1, has a suction opening 14 disposed in an angular position in the area of the maximal shift of the profile of the guide 9 with respect to the axis of rotation 4 of the rotor 1 and connected to the spaces 5 under the flaps 2. The suction opening 14 can be arched and extended in the direction opposite to the direction of rotation of the rotor 1. A conduit 15 for carrying out gas exchange between spaces 5 and 6 is also provided in the cover 12. An inlet 16 of the gas-exchange conduit 15 is positioned opposite the space 5 under the flap 2 in the area of its minimal distance from the axis of rotation 4 of the rotor 1, and an outlet 17 is positioned opposite the space 6 above the flap 2 wherein, the inlet 16 and the outlet 17 of the gas exchange conduit 15 are disposed in an angular position in the area of the minimal shift of the profile of the guide 9 with respect to the axis of rotation 4 of the rotor 1. The other end face of the rotor 1 is provided with an end face wall 18. Each carrier 10 that serves for rotating its flap 2 with respect to the swivel 3, is made in the form of a crank 19 located off the wall 18 and rigidly connected to the flap 2 in the area of the swivel 3 so that both the crank 19 and the flap are capable of rotating about an axis 20 of the swivel 3. The guide 9 is in contact with another end 21 of the crank 19. The annular guide 9 may be made in the form of a groove 22 in a floating ring 23 that is coaxial with the guide and positioned with respect to its internal diameter on a wear-resistant adapting bushing 24 which in turn is rigidly attached on the end face wall 8 of the body 7. The annular groove 22 has two annular working surfaces 25 and 26 which are in contact with the ends 21 of the crank 19. An oil space 27 is formed between the wall 18 of the rotor 1 and the end face wall 8 of the body 7. There are oil-delivering ports 28 arranged in the adapting bushing 24 under the floating ring 23. The ports 28 are coupled to oil-delivering ports 29 of the body 7, which in turn are coupled to an oil-supply system. There is an exhaust opening 30 disposed in an angular position on the body 7 in the area of the minimal shift of the profile of the guide 9 with respect to the rotation axis 4 of rotor 1. A spark plug 31 is mounted on the body 7 inside it and opposite the spaces 6. The plug is mounted in an angular position in the area of the maximal shift of the profile of the guide 9 with respect to the axis of rotation 4 of the rotor 1.

Two engines are easily arranged as an integral unit. In the unit, two separate engines face one another by the covers 12, which covers in this case form an integral end face wall 32. Eccentricities "e" of the longitudinal axes 11 of the guides 9 of these two engines are directed in directions opposite to the axis of rotation 4 of the rotor 1. The unit has a common oil space 33, and its two rotors have a common shaft 34. There two suction openings 14 made in the integral wall 32 with radial input conduits 35 that serve to supply air into the left and right engines.

An additional space 37, communicating with the space 5 and having on its wall a through opening 38 that communicates with the inlet 16 of the gas-exchange conduit 15, may be formed on the wall 36 of the rotor 1, under each flap 2.

The inlet 16 of the gas-exchange conduit on the cover 12 may be provided with a segment groove 39 directed in the direction opposite to the direction of rotation of the rotor 1.

The rotor 1 on its external diameter may be provided with a wall 40 in which tangential openings 41 are made in the form of, for example, slot nozzles.

The annular guide 9 may also be made in the simplest way, in particular, in the form of an annular groove 42 on the end face wall 8 of the body 7 (FIG. 1).

The engine operates in the following manner.

When the flap 2 is in the uppermost position, atmospheric air, via the suction opening 14, enters the space 5 under the flap 2, and when the rotor rotates, precompression of the air takes place. Maximum precompression is effected when the rotor 1 rotates by half a turn. When the flap 2 is in the area of the uppermost position, the air in the space 6 above the flap 2 is compressed to the maximum degree. At that moment, fuel is injected into the space 6, its combustion takes place, and the gas mixture having high energy begins to act on the flap 2, increasing the volume in the space 6 above the flap 2. When the rotor 1 rotates by half a turn, the space 5 which at that moment contains the air compressed therein is in a position opposite the inlet 16 of the gas-exchange conduit 15, and this air, via the conduit 15 and through its outlet 17, enters the space 6 that has, at that moment, a maximum volume and, consequently, a minimum pressure. The waste gas is pushed out of the space 6, and the space is filled with clean air from the space 5. The displaced gas, via the exhaust opening 30, is discharged into the atmosphere. Upon further rotation of the rotor 1, compression of the air in the space 6 begins and the air compressed to maximum is situated in the uppermost point. Atmospheric air is drawn into the space 5 via the arched suction opening 14. The flap 2 is once again in the uppermost point and the work cycle repeats. Since there are relatively many flaps on an engine, there are as many cycles during one rotation of the rotor as there are flaps on the rotor.

In the rotor 1 with the wall 40 on its external diameter, gas from the space 6 that is subjected to blowing and the air that performs the blowing and comes from the space 5 with the rotor 1 in the lowest position are directed to the tangential openings 41 in the wall, creating the "turbine" effect in the rotor and obtaining an additional torque on the rotor.

The unit consisting of two engines, facing one another via the covers 13 and forming in that case an integral end face wall 32, works so that when the rotors rotate, their forced imbalances are directed in opposite directions, and a virtually balanced system of two rotors is obtained. Thus, the necessity of installing two flywheels-counterbalances, as, for example, in the Wankel engine, is obviated.

The additional space 37, formed on the wall 36 of rotor 1 under each flap 2 and having a through opening 38 which communicates with the inlet 16 of the gas-exchange conduit 15, controls, by its volume, the precompression that takes place in the space 5 under the flap 2. The segment groove 39 on the cover 13, that begins at the inlet 16 of the gas-exchange conduit 15 and is directed in the direction opposite to the direction of rotation of the rotor 1, performs the same function.

Thus, the annular guide makes it possible for the crank to move smoothly on its high-quality working surface, which makes it possible to obtain a sufficiently high frequency of rotation of the rotor. As is evident from the example provided above, a cycle of a two-stroke engine having an excellent system for blowing the waste gases, filling the working spaces with clean air, and furthermore having precompression, is easily effected.

The tangential openings on the external wall of the rotor make it possible to drive the rotor up to speed owing to the outflow of the waste gases therethrough. Thus, a turbine stage of the engine appears, creating an additional torque. In view of this circumstance, the title of the invention is a rotary-turbine engine.

What is claimed is:

1. A rotary-turbine internal combustion engine, comprising:

a cylindrical body having an end face wall;

a rotor having longitudinal flaps which are swivel mounted on said rotor in an area of an external diameter portion thereof along a rotational axis and defining spaces separated from one another, the spaces being dispose opposite sides of each of said flap and said flaps have carriers connected thereto;

said rotor being positioned in said end face wall of said cylindrical body;

a closed guide in contact with said carriers of said flaps; and a conduit in communication with the spaces for gas-exchange between the spaces;

wherein said guide is disposed on the end face wall of the body and comprises an annular guide having a longitudinal axis which is positioned eccentrically relative to the rotational axis of the rotor; and wherein the annular guide comprises a floating ring that is coaxial with respect to the annular guide and is disposed on the end face wall of the body.

2. The rotary-turbine engine as claimed in claim 1, wherein the rotor has an end face wall, each of said carriers comprise a crank positioned outside said end face wall of said rotor and rigidly connected to an adjacent flap of said flaps so that an axis of rotation of the crank and a swivel axis of and said flap swivel coincide, and wherein a second end of the crank contacts the guide.

3. The rotary-turbine engine as claimed in claim 2, wherein the suction opening comprises an opening extending in a direction opposite to the direction of rotation of the rotor.

4. The rotary-turbine engine as claimed in claim 2, which comprises:

an additional space communicating with a space formed on the rotor wall under each of the flaps; and a through opening communicating with the gas-exchange conduit inlet, the through opening being formed in the rotor wall.

5. The rotary-turbine engine as claimed in claim 2, wherein the inlet of the gas-exchange conduit on the end face wall of the body has a segment groove formed therein extending in a direction opposite the direction of rotation of the rotor.

6. The rotary-turbine engine as claimed in claim 1, wherein an end face of the rotor directly contacts with the end face wall of the body and the cylindrical body has an exhaust opening;

the end face wall being provided with a suction opening connected to a space under a flap of said flaps, and also to an inlet and an outlet of the gas-exchange conduit;

the inlet of the gas-exchange conduit being disposed opposite the space under said flap in an area having the same minimal distance from the rotation axis of the rotor, and the outlet of said conduit being disposed opposite the space above said flap, the suction opening being disposed at an angular position in an area of maximal displacement of the guide profile with respect to the rotational axis of the rotor, the inlet and outlet of the gas-exchange conduit and also said exhaust opening of said cylindrical body being disposed at an angular position in the area of the minimal displacement of the guide profile with respect to the rotational axis of the rotor.

7. The rotary-turbine engine as claimed in claim 6, which comprises:

an additional space communicating with a space formed on the rotor wall under each of the flaps; and a through opening communicating with the gas-exchange conduit inlet, the through opening being formed in the rotor wall of the additional space.

8. The rotary-turbine engine as claimed in claim 6, wherein the inlet of the gas-exchange conduit on the end face wall of the body has a segment groove extending in a direction opposite to the direction of rotation of the rotor.

9. The rotary-turbine engine as claimed in claim 6, wherein the suction opening comprises an arched opening extending in a direction opposite to the direction of rotation of the rotor.

10. The rotary-turbine engine as claimed in claim 1, which comprises:

an additional space communicating with a space formed on the rotor wall under each of the flaps; and a through opening communicating with the gas-exchange conduit inlet, the through opening being formed in the rotor wall.

11. The rotary-turbine engine as claimed in claim 1, wherein the inlet of the gas-exchange conduit on the end face wall of the body has a segment groove extending in a direction opposite the direction of rotation of the rotor.

12. The rotary-turbine engine as claimed in claim 11, wherein the tangential openings comprise slot nozzles.

13. The rotary-turbine engine as claimed in claim 1, wherein the rotor along the external diameter is provided with a wall having tangential openings formed therein.

14. The rotary-turbine engine as claimed in claim 13, wherein the tangential openings comprise slot nozzles.

15. The rotary-turbine engine as claimed in claim 1, wherein the tangential openings comprise slot nozzles.

16. The rotary-turbine engine as claimed in claim 1, wherein the suction opening comprises an arched opening extending in a direction opposite that of a direction of rotation of the rotor.

17. The rotary-turbine engine as claimed in claim 1, wherein said engine comprises a unit comprising of first and second engines that face one another via the end face walls thereof each of which has said rotor; the walls of said engines directly contacting the end faces of each said rotor, each said rotor being positioned so as to be interconnected with one another;

wherein the walls of said bodies form a single end face wall of the unit; and wherein eccentricities of the longitudinal axes of the guides of the two engines extend in directions that are opposite the axis of rotation of the rotors.

18. The rotary-turbine engine as claimed in claim 17, wherein an additional space communicating with space formed on the rotor wall under each of the flaps; and a through opening communicating with the gas-exchange conduit inlet, the through opening being formed in the rotor wall.

19. The rotary-turbine engine as claimed in claim 17, wherein the inlet of the gas-exchange conduit on the end face wall of the body has a segment groove extending in a direction opposite the direction of rotation of the rotor.

20. The rotary-turbine engine as claimed in claim 17, wherein the rotor along the external diameter thereof has a wall having tangential openings formed therein.

21. A rotary-turbine internal combustion engine assembly having a first and second engine, each engine, comprising:

a cylindrical body having all end face wall;

a rotor having longitudinal flaps which are swivel mounted on said rotor in an area of an external diameter portion thereof along a rotational axis and defining spaces separated from one another, the spaces being disposed on opposite sides of each of said flaps and said flaps having carriers connected thereto;

said rotor being positioned in said end face wall of said cylindrical body;

a closed guide in contact with said carriers of said flaps; and a conduit in communication with the spaces for gas-exchange between the spaces;

wherein said guide is disposed on the end face wall of the cylindrical body and comprises an annular guide which has a longitudinal axis which is set eccentrically relative to the rotational axis of the rotor, said first and second engines facing one another via the end face walls, the walls of said engines directly contacting end faces of each said rotor, each said rotor having a shaft so as to be rigidly interconnected;

wherein the walls of said bodies form a single end face wall of the unit, and wherein eccentricities of the longitudinal axes of the guides of the two engines extend in directions that are opposite the axis of rotation of the rotors.

\* \* \* \* \*